United States Patent
Kaneko et al.

[11] Patent Number: 6,164,171
[45] Date of Patent: Dec. 26, 2000

[54] SCREWDRIVER USED FOR SCREW TIGHTENER AND SCREW SUITABLY TIGHTENED BY THE SCREWDRIVER

[75] Inventors: Yoshihiro Kaneko; Mitsuhisa Machida; Tomoaki Sakata, all of Tokyo, Japan

[73] Assignee: MAX Co., Ltd., Tokyo, Japan

[21] Appl. No.: 09/266,751

[22] Filed: Mar. 12, 1999

[30] Foreign Application Priority Data

Mar. 13, 1998 [JP] Japan .................................. 10-062953
Jun. 30, 1998 [JP] Japan .................................. 10-185172

[51] Int. Cl.[7] .................................................. B25B 23/00
[52] U.S. Cl. ............................................. 81/460; 81/436
[58] Field of Search .............................. 81/460, 436, 461

[56] References Cited

U.S. PATENT DOCUMENTS

| | | | |
|---|---|---|---|
| 2,815,054 | 12/1957 | Cummaro | 81/460 |
| 2,847,894 | 8/1958 | Smith et al. | 81/460 |
| 2,859,782 | 11/1958 | Cummaro | 81/460 |
| 3,108,623 | 10/1963 | Muenchinger . | |
| 3,282,145 | 11/1966 | Prescott | 81/436 |

FOREIGN PATENT DOCUMENTS 2 271 903  12/1975  France .
6-63273    9/1994   Japan .

OTHER PUBLICATIONS

Cross Recesses for Screws, 1985, pp. 321–239.

*Primary Examiner*—Stephen F. Gerrity
*Assistant Examiner*—Hadi Shakeri
*Attorney, Agent, or Firm*—Jacobson, Price, Holman & Stern, PLLC

[57] ABSTRACT

A screwdriver used for a screw tightener includes at its tip portion a blade having a plurality of flat plate portions to be meshed in a recess formed in a head of a screw. In this screwdriver, each of the flat plate portions has at its tip portion an outer peripheral surface which extends in such a manner as to be converged in the direction toward the tip portion of the screwdriver. The outer peripheral surface of the flat plate portion is formed into an angled shape having a ridge line portion extending in the direction toward the tip portion of the screwdriver.

7 Claims, 21 Drawing Sheets

SCREWDRIVER USED FOR SCREW TIGHTENER AND SCREW SUITABLY TIGHTENED BY THE SCREWDRIVER

BACKGROUND OF THE INVENTION

1. Field of the Invention

The present invention relates to a screwdriver used for a screw tightener and to a screw suitably tightened by the screwdriver, and particularly to the structure of a screwdriver used for a screw tightener adapted to turn a screw using a power and to the structure of a screw suitably tightened by the screwdriver.

2. Description of the Related Art

A known screwdriver used for a screw tightener automatically rotated using a power source such as an air motor is shown in FIGS. 19 and 20. In these figures, reference numeral 1 designates a screwdriver having at its tip portion a blade 5 to be fitted in a recess 4 formed in a head 3 of a screw 2 shown in FIGS. 21 and 22. The tip portion of the blade 5 is sharpened in a truncated cone shape, and outer peripheral surfaces 7 of flat plate portions 6 forming the blade 5 are formed to constitute a peripheral surface of the cone.

As the recess 4 formed in the head 3 of the screw 2, there is known a type in which an intersecting portion 8 between two adjacent ones of grooves 4A and 4B constituting the recess 4 is formed into a round shape as shown in FIG. 23 or a type in which an intersecting portion 9 is formed into an angled shape as shown in FIG. 24.

Incidentally, of recent screw tighteners using an electric or air motor as a drive source, one type is known in which the head 3 of the screw 2 is set in such a manner as to be held by the tip portion of the blade 5 of the screwdriver 1.

The screw 2 is screwed in an object (for example, a construction board such as a gypsum board) by such a screw tightener as follows: namely, the screw 2 is set in the screw tightener with the tip portion thereof directed to the construction board; a trigger of the screw tightener is actuated to make the screwdriver 1 collide with the head 3 of the screw 2 for fitting the blade 5 of the screwdriver 1 in the recess 4, whereby the tip portion of the screw 2 is driven in the construction board; and the screwdriver 1 is rotated to screw the screw 2 in the construction board. In this case, when the screw 2 is driven in the construction board by the initial impact, a large portion of the screw 2 is buried in the construction board, and the remaining screw-in portion of the screw becomes short. Accordingly, the related art screw tightener has an advantage in making short a working time required to tighten the screw by the screw tightener.

The related art screwdriver used for a screw tightener, however, has the following problem. When the screw 2 is screwed in an object by the screw tightener, the outer peripheral surfaces 7 of the blade 5 of the screwdriver 1 are brought in contact with the intersecting portions 8 or intersecting portions 9 forming the recess 4 of the screw 2. This may cause an inconvenience that the screwdriver 1 is rotated in a state in which the blade 5 is not perfectly fitted in the recess 4. In such a state, the screwdriver 1 rotating at a high speed cannot be fitted in the recess 4 of the screw 2, with a result that the tightening work is completed in a "head floating" state in which the screw-in portion of the screw 2 is floated from the construction board, thereby failing to obtain a sufficient tightening force. Also, in such a state, the intersecting portions 8 or 9 forming the recess 4 may be damaged, so that it takes a lot of time to draw the screw 2, thereby degrading workability, and further, the flat plate portions 6 of the screwdriver 1 may be damaged.

In particular, if an apex angle of each of the outer peripheral surfaces 7, formed to constitute the peripheral surface of the cone, of the flat plate portions 6 forming the blade 5 is large, there occurs a problem that since the radius of the outer peripheral surface 7 is kept constant, a probability becomes large in which the blade 5 is not fitted in the recess 4 when the outer peripheral surfaces 7 are brought in contact with the intersecting portions 8 or 9.

The related art screwdriver 1 has a further problem that since the screwdriver 1 cannot firmly hold the screw 2, the screw 2 may be tilted in relation to the construction board. If the screwdriver 1 is rotated in such a state, a load necessary for screwing the screw 2 in the construction board becomes large to a value over the capacity of the screw tightener, and at the worst case, it becomes impossible to continue the screwing work.

Even if the screw 2 can be fortunately screwed in the construction board, there may occur an inconvenience that the head 3 of the screw 2 is tilted, with a result that the surface of the construction board is broken by a portion, on the sunk side, of a circumferential edge of the head 3, to thereby reduce the proof stress at a junction between the screw 2 and the construction board.

SUMMARY OF THE INVENTION

An object of the present invention is to provide a screwdriver used for a screw tightener, which is capable of increasing, upon screwing of a screw by the screw tightener, a probability that a blade of the screwdriver is fitted in a recess formed in the screw, thereby preventing occurrence of a failure in the screwing work and a damage of the screwdriver.

Another object of the present invention is to provide a screw suitably tightened by a screwdriver mounted on a screw tightener, which is capable of increasing, upon screwing of a screw by the screw tightener, a probability that a blade of the screwdriver is fitted in a recess formed in the screw, thereby preventing occurrence of a failure in the screwing work and a damage of the screwdriver.

To solve the above problems, according to a first aspect of the present invention, there is provided a screwdriver, used for a screw tightener, including at its tip portion a blade having a plurality of flat plate portions to be meshed in a recess formed in a head of a screw, characterized in that each of the flat plate portions has at its tip portion an outer peripheral surface which extends in such a manner as to be converged in the direction toward the tip portion of the screwdriver, the outer peripheral surface being formed into an angled shape having a ridge line portion extending in the direction toward the tip portion of the screwdriver.

With this configuration, when the screwdriver is inserted in the recess, it becomes possible to make small a probability that the ridge line portions of the blade are matched with the intersecting portions of the recess and hence to make large a probability that the blade of the screwdriver is fitted in the recess of the screw. As a result, in the case of carrying out the screw tightening works by bringing the screw in contact with an object such as a construction board using the screw tightener, applying an impact force to the head of the screw by the screwdriver to drive the screw in the object, and turning the screwdriver to tighten the screw, it becomes easy for the blade of the screwdriver to be fitted in the recess of the head of the screw. This leads to effects of reducing occurrence of a damage of the recess formed in the head of the screw when the screwdriver is rotated, thereby improving the workability, and also of reducing occurrence of a damage of the screwdriver.

According to a second aspect of the present invention, there is provided a screwdriver used for a screw tightener, wherein the ridge line portion of the outer peripheral surface of at least one of the flat plate portions is offset rightwardly or leftwardly from a center line of the flat plate portion in the thickness direction.

With this configuration, it is possible to obtain an effect of further increasing the probability that the screwdriver is fitted in the head of the screw.

According to a third aspect of the present invention, there is provided a screwdriver, used for a screw tightener, including a plurality of flat plate portions to be meshed in a recess formed in a head of a screw, characterized in that each of the flat plate portions has at its tip portion an outer peripheral surface which extends in such a manner as to be converged in the direction toward the tip portion of the screwdriver, at least one of the outer peripheral surfaces having a cutout portion formed at a portion thereof.

With this configuration, it is possible to obtain an effect of further increasing the probability that the screwdriver is fitted in the head of the screw.

According to a fourth aspect of the present invention, there is provided a screwdriver used for a screw tightener, wherein the cutout portion is formed on the right side of the outer peripheral surface as seen in the direction from the tip portion to a main portion of the screwdriver.

With this configuration, it is possible to obtain an effect of further increasing the probability that the screwdriver is fitted in the head of the screw.

According to a fifth aspect of the present invention, there is provided a screwdriver used for a screw tightener, wherein an end portion of the cutout portion on the side where the screwdriver is mounted on the screw tightener is located at a position corresponding to the vicinity of a front surface of the head of the screw located when the tip portion of the blade is perfectly fitted in the recess of the screw.

With this configuration, it is possible to obtain an effect of preventing the strength of the outer peripheral surface having the cutout portion from being reduced.

According to a sixth aspect of the present invention, there is provided a screwdriver used for a screw tightener, wherein the maximum width of the cutout portion is at least one-sixth the thickness of the flat plate portion or more.

With this configuration, it is possible to obtain an effect of further increasing the probability that the screwdriver is fitted in the head of the screw.

According to a seventh aspect of the present invention, there is provided a screwdriver used for a screw tightener, wherein the flat plate portions of the screwdriver are formed into a crisscross shape having four elements spread out in transverse cross-section.

With this configuration, it is possible to obtain an effect of further increasing the probability that the screwdriver is fitted in the head of the screw.

According to an eighth aspect of the present invention, there is provided a screw, suitably tightened by a screwdriver mounted on a screw tightener, including a head having a recess composed of grooves formed into an approximately crisscross shape, in which grooves a blade of the screwdriver mounted on the screw tightener is to be fitted, characterized in that at least one of four intersecting portions, each of which is formed by two adjacent ones of the approximately crisscross shaped grooves of the recess, is formed in an angled shape having a ridge line portion at a position offset from a bisector which bisects a crossing angle formed between center lines each connecting the widthwise centers of two opposed ones of the approximately crisscross shaped grooves to each other.

With this configuration, it is possible to obtain an effect of further increasing the probability that the screwdriver is fitted in the head of the screw.

According to a ninth aspect of the present invention, there is provided a screw, suitably tightened by a screwdriver mounted on a screw tightener, including a head having a recess composed of four grooves formed into an approximately crisscross shape, in which grooves flat plate portions constituting a blade of the screwdriver mounted on the screw tightener are to be respectively fitted, characterized in that a tip portion of each of the four grooves formed into the approximately crisscross shape has a gap which allows a ridge line portion of an outer peripheral surface formed at a tip portion of each of the flat plate portions to project thereinto.

With this configuration, a contact region between the blade and the recess is not made narrow even if the ridge line portions each being formed in an angled shape are provided on the blade of the screwdriver. This leads to effects of preventing a transmitting range of the rotational torque of the screwdriver from being reduced, and of preventing the ridge line portions of the blade from being damaged.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Hereinafter, embodiments of a screwdriver, used for a screw tightener, according to the present invention will be described with reference to the drawings.

Figure 1:
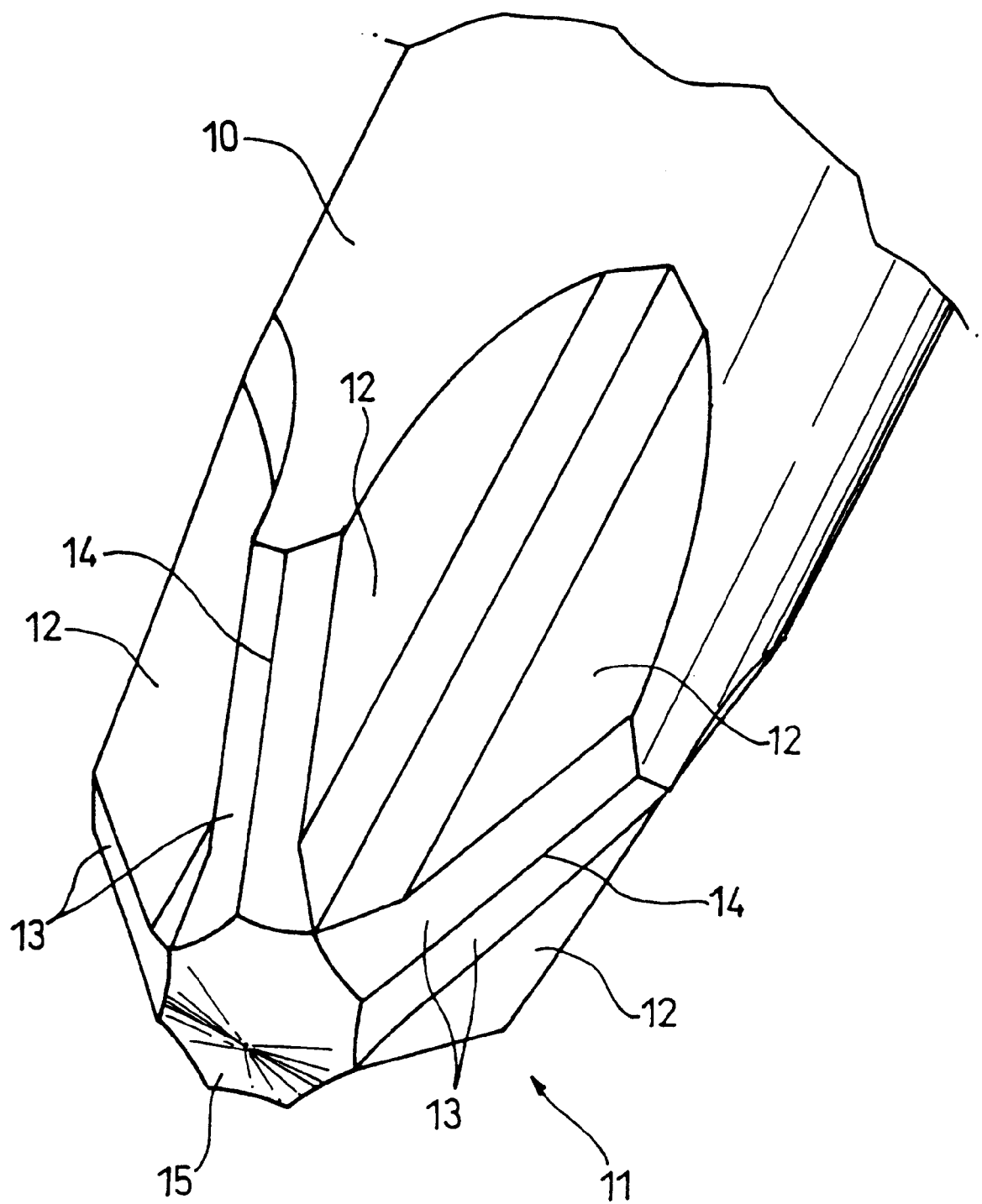
FIG. 1 is a perspective view showing a tip portion of a screwdriver, used for a screw tightener, according to a first embodiment of the present invention.
Figure 3:
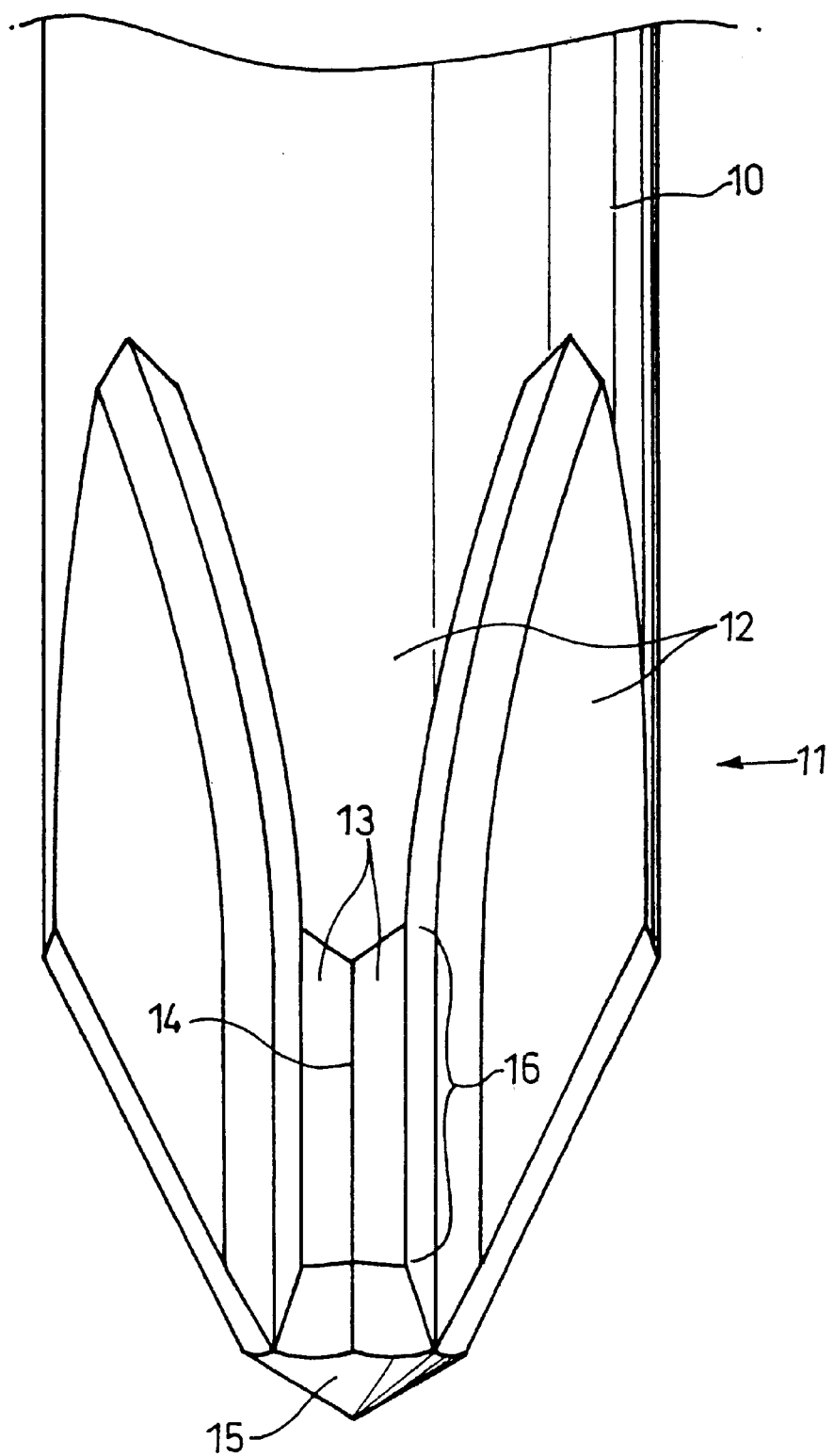
FIG. 3 is a side view showing an outer peripheral surface of a flat plate portion formed at the tip portion of the screwdriver used for the screw tightener shown in FIG. 1.
Figure 23:
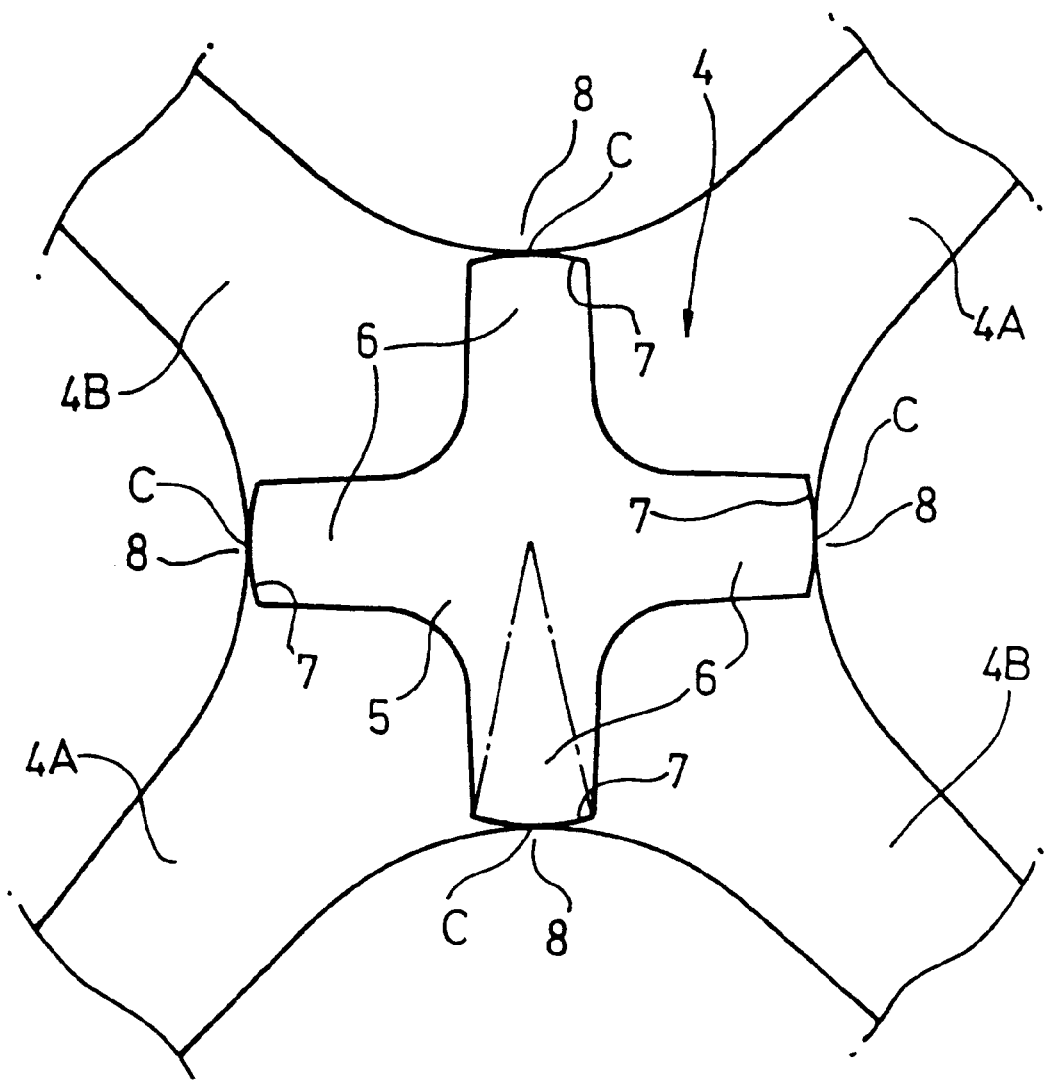
FIG. 23 is a plan view showing one example of a shape of a recess formed in a head of a related art screw.

FIG. 1 is a perspective view showing a tip portion of a screwdriver, used for screw tightener, according to a first embodiment of the present invention. A blade 11 of a screwdriver 10 is formed by four pieces of flat plate portions 12 combined in a crisscross shape. Each of outer peripheral surfaces 13, to be inserted in a recess 4 (see FIGS. 23 and 24), of the flat plate portions 12 has a ridge line portion 14 formed into an angled shape in cross-section. A tip portion 15 of the blade 11 formed by the four pieces of flat plate portions 12 is formed into a conical shape. A portion 16, having the outer peripheral surface 13, of each flat plate portion 12 has, as shown in FIG. 3, an approximately uniform wall thickness in the axial direction of the screwdriver 10. The ridge line portion 14 in this embodiment is formed into the angled shape in transverse cross-section; however, it may be formed into a chamfered shape with a micro-radius of curvature.

The screwdriver 10, in which the ridge line portion 14 is formed on the outer peripheral surface 14 of each flat plate portion 12, has the following advantage. That is to say, even if each intersecting portion 8 of the recess 4 of the screw 2 has a round peripheral wall surface (see FIG. 23), it is possible to make small a probability that the ridge line portions 14 are brought in contact with positions C in the intersecting portions 8. Here, the position C is specified such that a bisector which bisects a crossing angle formed between two center lines passing through widthwise centers of two opposed ones of the grooves formed into a crisscross shape intersects the intersecting portion 8 at the position C. Accordingly, it becomes possible to make small a probability that the flat plate portions 12 of the screwdriver 10 are brought in contact with the intersecting portions 8 of the recess 4 and thereby they are not fitted in the recess 4, and hence to make large a probability that the blade 11 of the screwdriver 10 is fitted in the recess 4 of the screw 2.

Also, even if the outer peripheral surfaces 13 of the flat plate portions 12 are brought in contact with the peripheral wall surfaces of the intersecting portions 8, the screwdriver 10 in this embodiment does not cause any inconvenience. That is to say, since the ridge line portion 14 is formed on each outer peripheral surface 13 and thereby the radii from the rotational center of the screwdriver 10 to respective positions of the outer peripheral surface 13 are different from each other, an impact force applied to the screwdriver 10 acts in the direction in which the outer peripheral surface 13 is slid along the peripheral wall surface of the intersecting portion 8. This further increases the probability that the flat plate portions 12 are fitted in the recess 4. In addition to this, the tip portion 15 of the blade 11 projecting in the conical shape, which functions as a guide, contributes to enhancement of the probability that the blade 11 is fitted in the recess 4.

Figure 24:
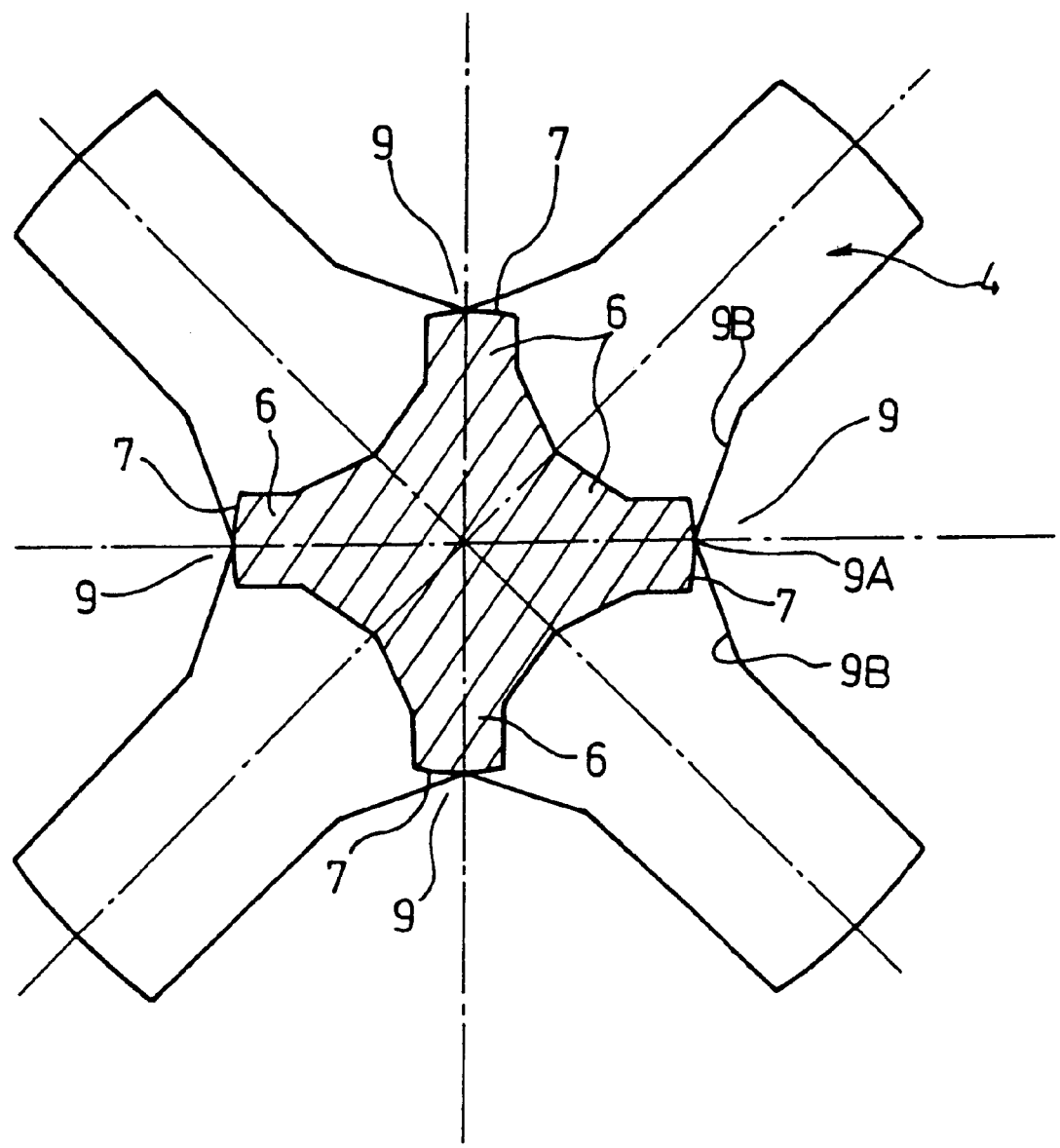
FIG. 24 is a plan view showing another example of a shape of a recess formed in a head of a related art screw.

The screwdriver 10 in this embodiment is also advantageous for the case where the blade 11 of the screwdriver 10 is fitted in the recess 4 having the intersecting portions 9 shown in FIG. 24. In this case, there is only a very small probability that the ridge line portions 14 are matched with the ridge line portions 9A of the intersecting portions 9, and accordingly, when the screwdriver 10 is pushed to the depth of the recess 4, the outer peripheral surfaces 13 are slid on the wall surfaces 9B of the intersecting portions 9. This is effective to significantly enhance the probability that the blade 11 is fitted in the recess 4.

As a result, in the works of screwing the screw 2 in an object (for example, construction board) using a screw tightener of an electric or air motor type, when the blade 11 of the screwdriver 10 is allowed to collide with the recess 4 of the screw 2 to drive the tip portion of the screw 2 in the object, it becomes easy for the blade 11 of the screwdriver 10 to be fitted in the recess 4. This makes it possible to eliminate inconveniences that the intersecting portions 8 of the recess 4 may be damaged and thereby the screwing of the screw 2 cannot be continued even by rotating the screwdriver 10, and that the blade 11 of the screwdriver 10 may be damaged upon rotation of the screwdriver 10.

Figure 4:
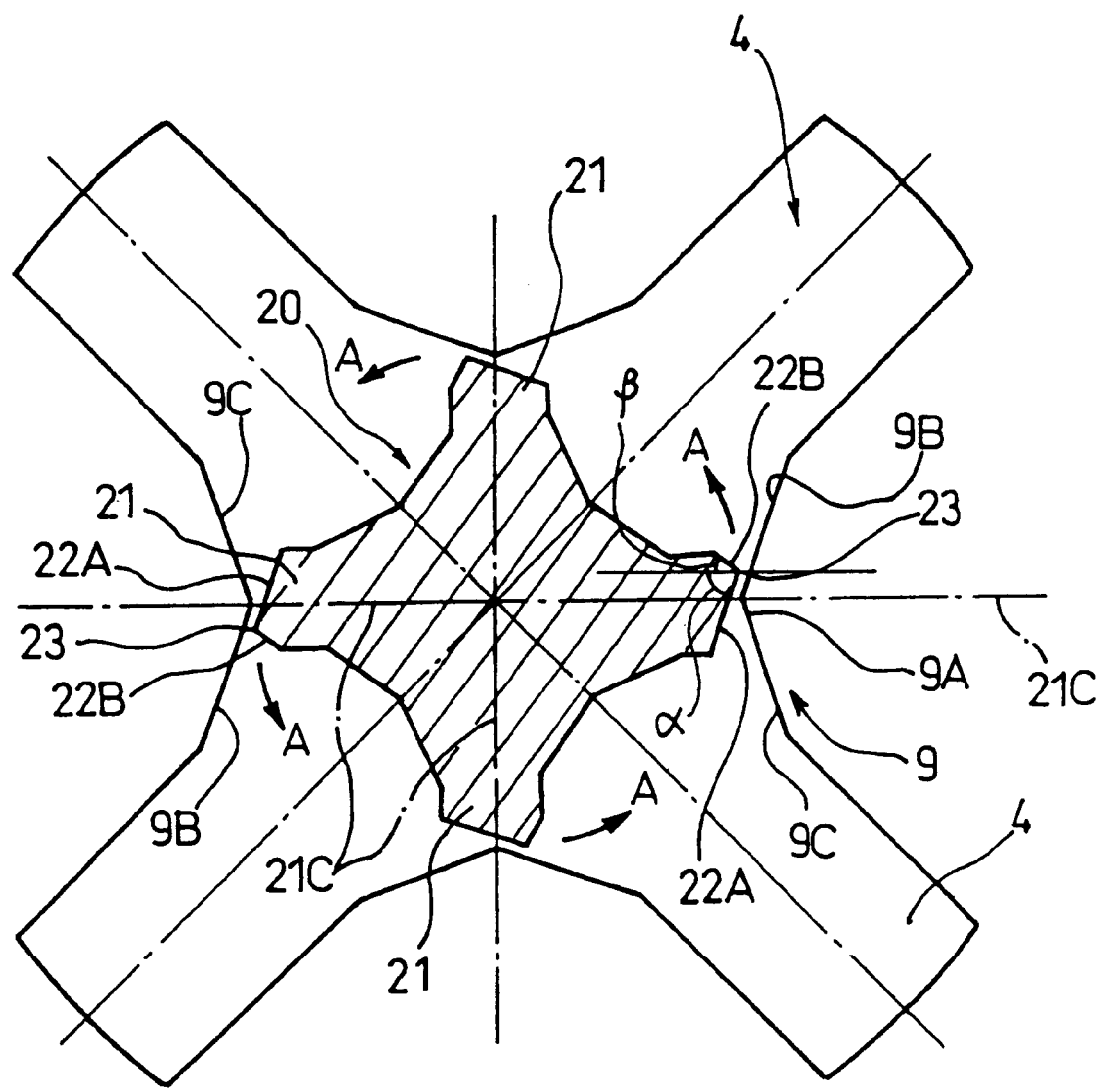
FIG. 4 is a transverse sectional view showing a state in which a tip portion of a screwdriver, used for a screw tightener, according to a second embodiment of the present invention is fitted in a recess formed in a head of a screw.

FIG. 4 is a transverse sectional view showing a state in which a tip portion of a screwdriver, used for a screw tightener, according to a second embodiment of the present invention is fitted in a recess formed in a head of a screw. In this second embodiment, each of four pieces of flat plate portions 21 constituting a blade 20 of the screwdriver has flat outer peripheral surfaces 22A and 22B, wherein a ridge line portion 23 between the outer peripheral surfaces 22A and 22B is formed at a position offset on one side from a center line 21C of the flat plate portion 21 in the thickness direction.

Figure 2:
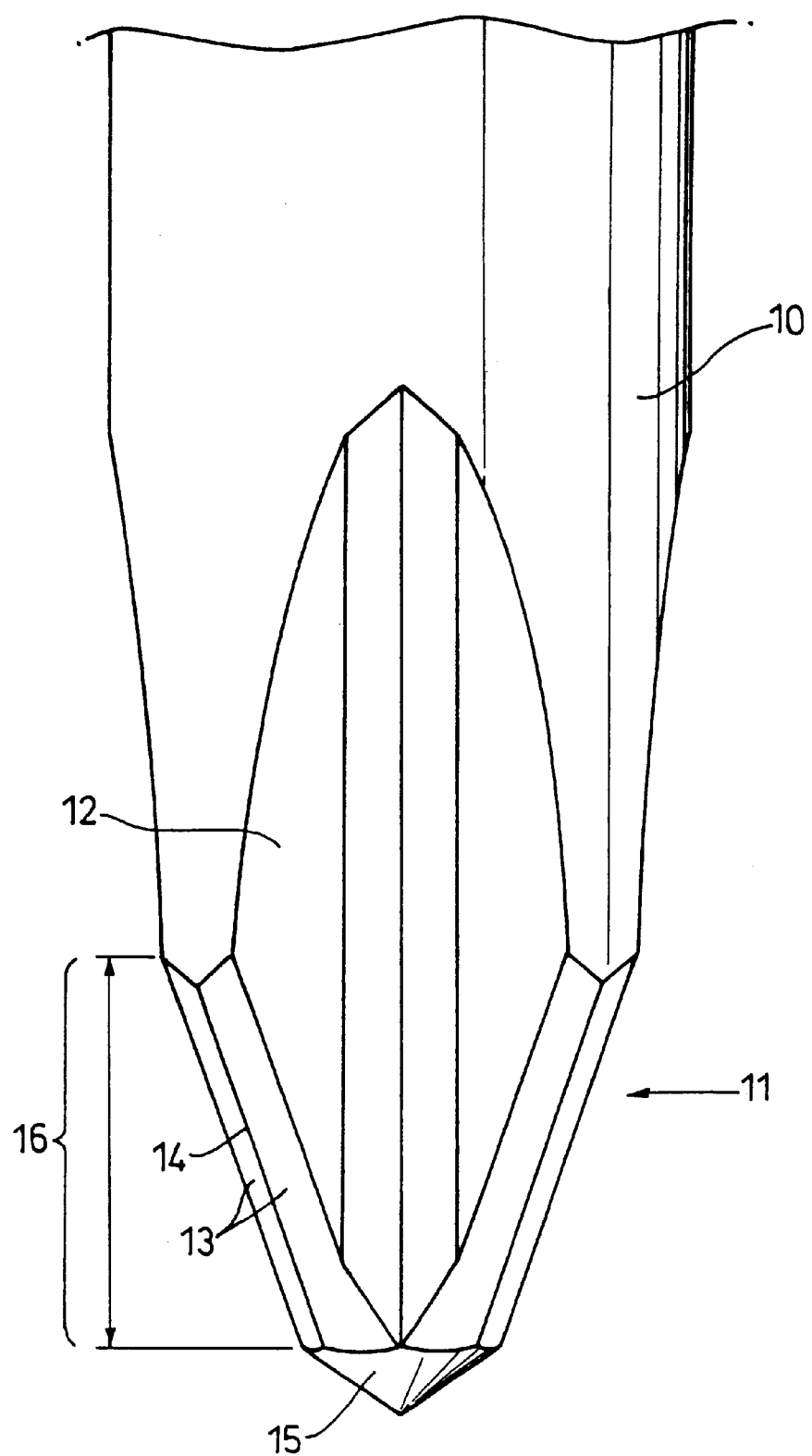
FIG. 2 is a side view showing a recessed portion formed in the tip portion of the screwdriver used for the screw tightener shown in FIG. 1.

The blade 20 of the screwdriver shown in FIG. 4 has the following advantage. That is to say, since the ridge line portion 23 of each flat plate portion 21 is offset from the center line 21C of the flat plate portion 21 in the thickness direction, there is a large probability that the outer peripheral surface 22A is brought in contact with the ridge line portion 9A. And, when the wide outer peripheral surface 22A is brought in contact with the ridge line portion 9A of the intersecting portion 9 of the recess 4, the outer peripheral surface 22A is moved in such a manner as to be slid in the direction A along the wall surface 9b of the intersecting portion 9. This is effective to make higher the probability that the blade 20 is rotatingly fitted in the recess 4 than that in the first embodiment shown in FIGS. 1 to 3. Even if the outer peripheral surface 22B is brought in contact with the wall surface 9C of the intersecting portion 9, such an outer peripheral surface 22B is moved along the wall surface 9C because it has a large tilt angle in relation to the center line 21C of the flat plate portion 21 in the thickness direction, so that the blade 20 is rotatingly fitted in the recess 4.

Figure 5:
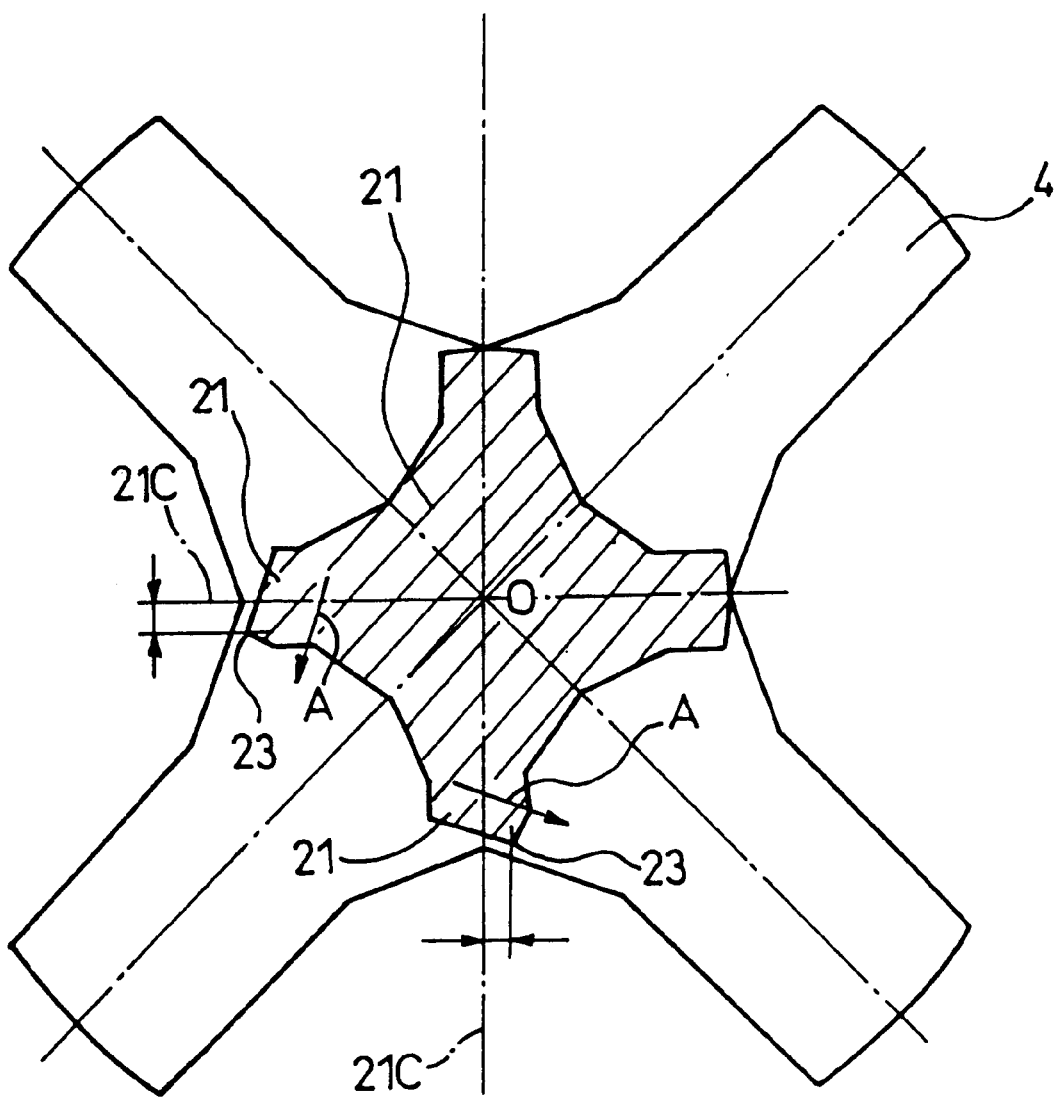
FIG. 5 is a transverse sectional view showing a state in which a tip portion of a screwdriver, used for a screw tightener, according to a third embodiment of the present invention is fitted in a recess formed in a head of a screw.

FIG. 5 is a transverse sectional view showing a state in which a tip portion of a third embodiment of the screwdriver, used for a screw tightener, of the present invention is fitted in a recess formed in a head of a screw. The screwdriver in this embodiment is configured such that the ridge line portions 23 are formed on two of the four pieces of flat plate portions 21 of the blade 20 of the screwdriver according to the second embodiment shown in FIG. 4. The screwdriver in the third embodiment shown in FIG. 5 has an advantage that since the blade 20 has a cross-sectional shape not symmetric with respect to an axial center O, it becomes easy for the blade 20 to be slid along the direction A and rotatingly fitted in the recess 4. Other configurations are the same as those described in the second embodiment with reference to FIG. 4.

Figure 6:
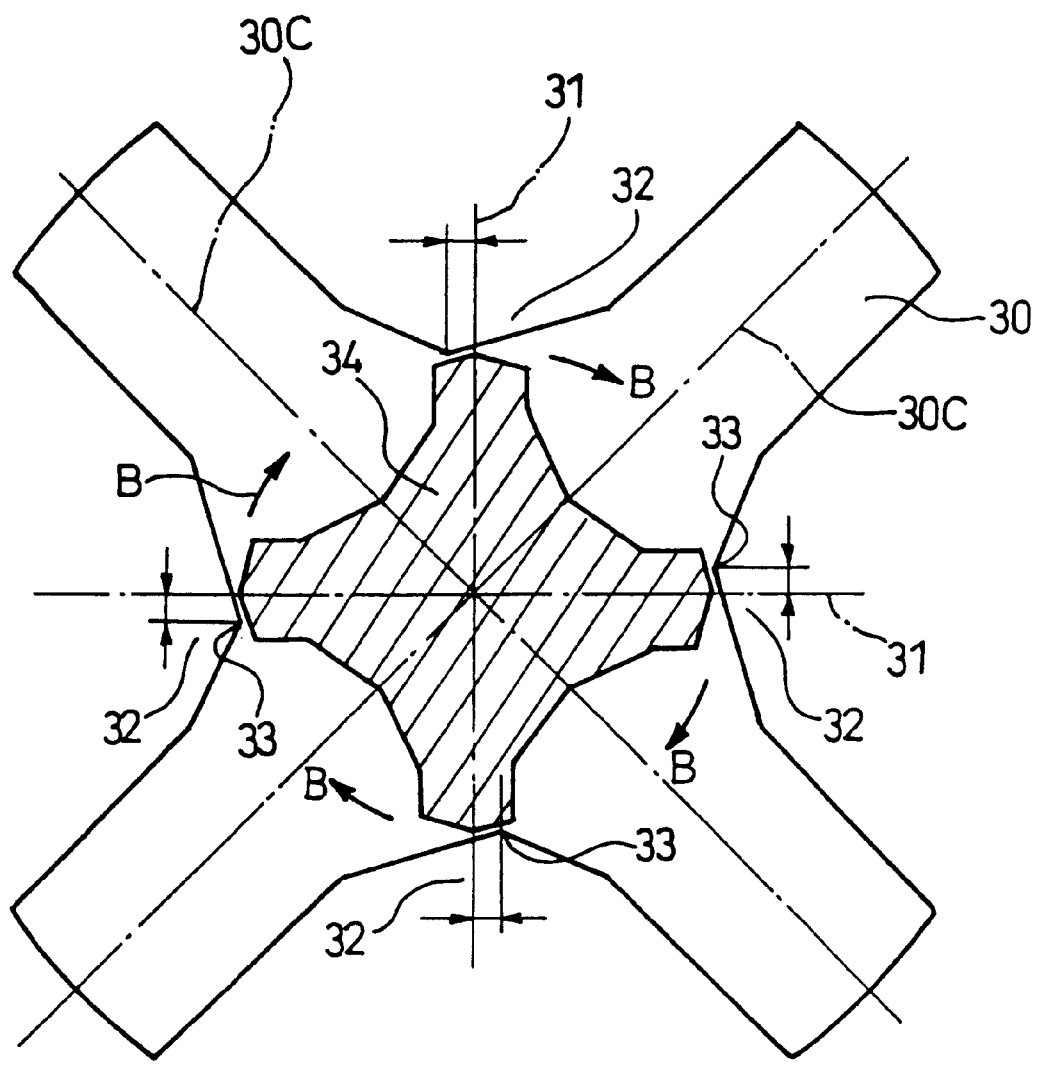
FIG. 6 is a plan view showing the shape of a recess formed in a head of a first embodiment of a screw of the present invention.

FIG. 6 is a plan view showing a shape of a recess formed in a head of a first embodiment of a screw of the present invention. In a recess 30 of the screw, each intersecting portion 32 has a ridge line portion 33 located at a position offset from a bisector 31 which bisects a crossing angle formed between center lines 30C passing through widthwise centers of grooves, formed into a crisscross shape, of the recess 30. The shape of the recess 30 of the screw shown in FIG. 6 is advantageous in that it becomes easier for a blade 34 of, for example, each of the screwdrivers shown in FIGS. 1 to 5 to be rotated in the direction B and hence rotatingly fitted in the recess 30.

Figure 7:
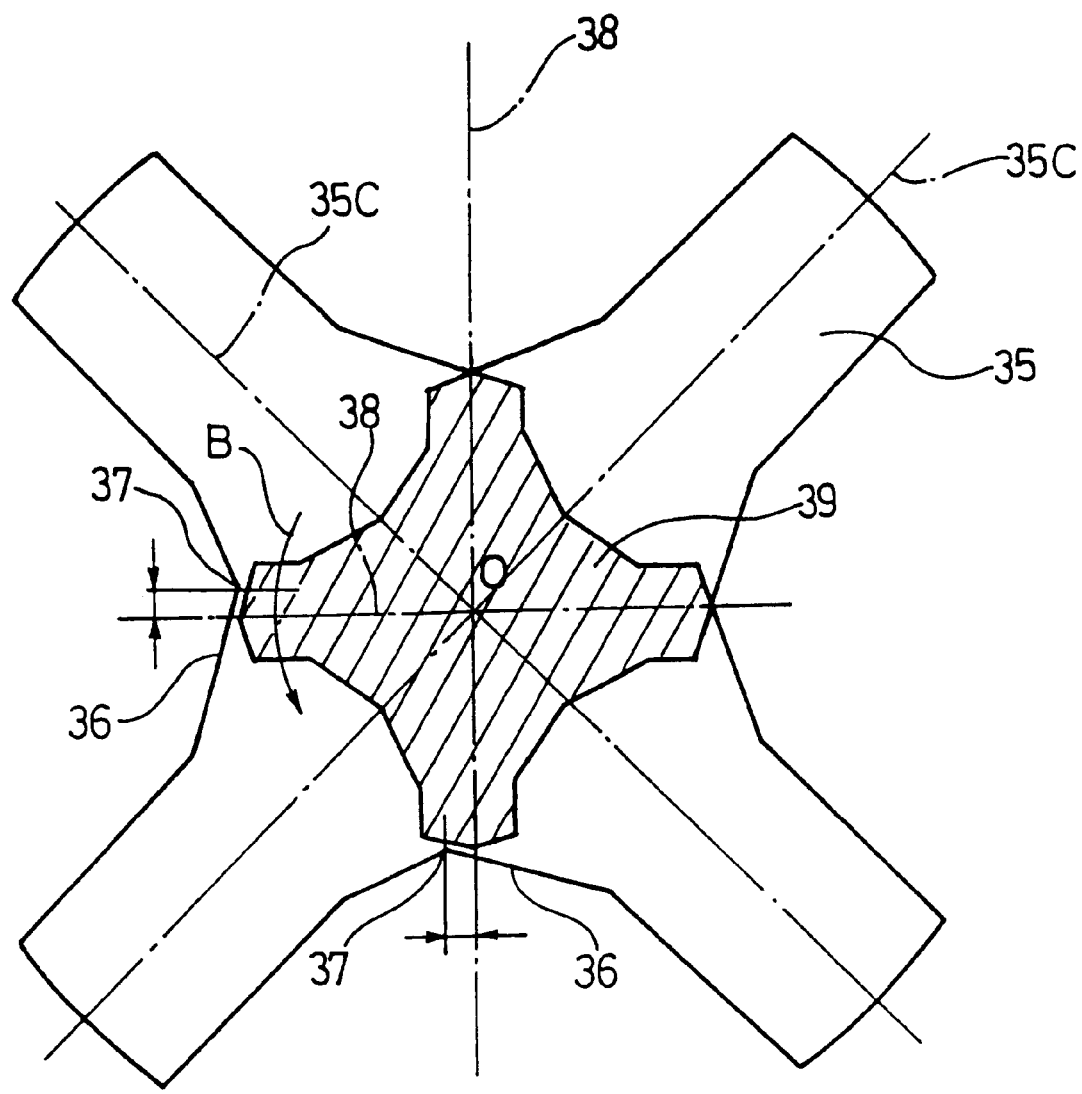
FIG. 7 is a plan view showing the shape of a recess formed in a head of a second embodiment of a screw of the present invention.

FIG. 7 is a plan view showing a shape of a recess formed in a head of a second embodiment of the screw of the present invention. In a recess 35, of four pieces of intersecting portions forming the recess 35, two pieces of the intersecting portions 36 each have a ridge line portion 37 located at a position offset from a bisector 38 which bisects a crossing angle formed between center lines 35C passing through widthwise centers of grooves, formed into a crisscross shape, of the recess 35. The shape of the recess 35 of the screw shown in FIG. 7 is advantageous in that it becomes easier for a blade 39 of, for example, each of the screwdrivers shown in FIGS. 1 to 5 to be rotated in the direction B and hence rotatingly fitted in the recess 35.

Figure 8:
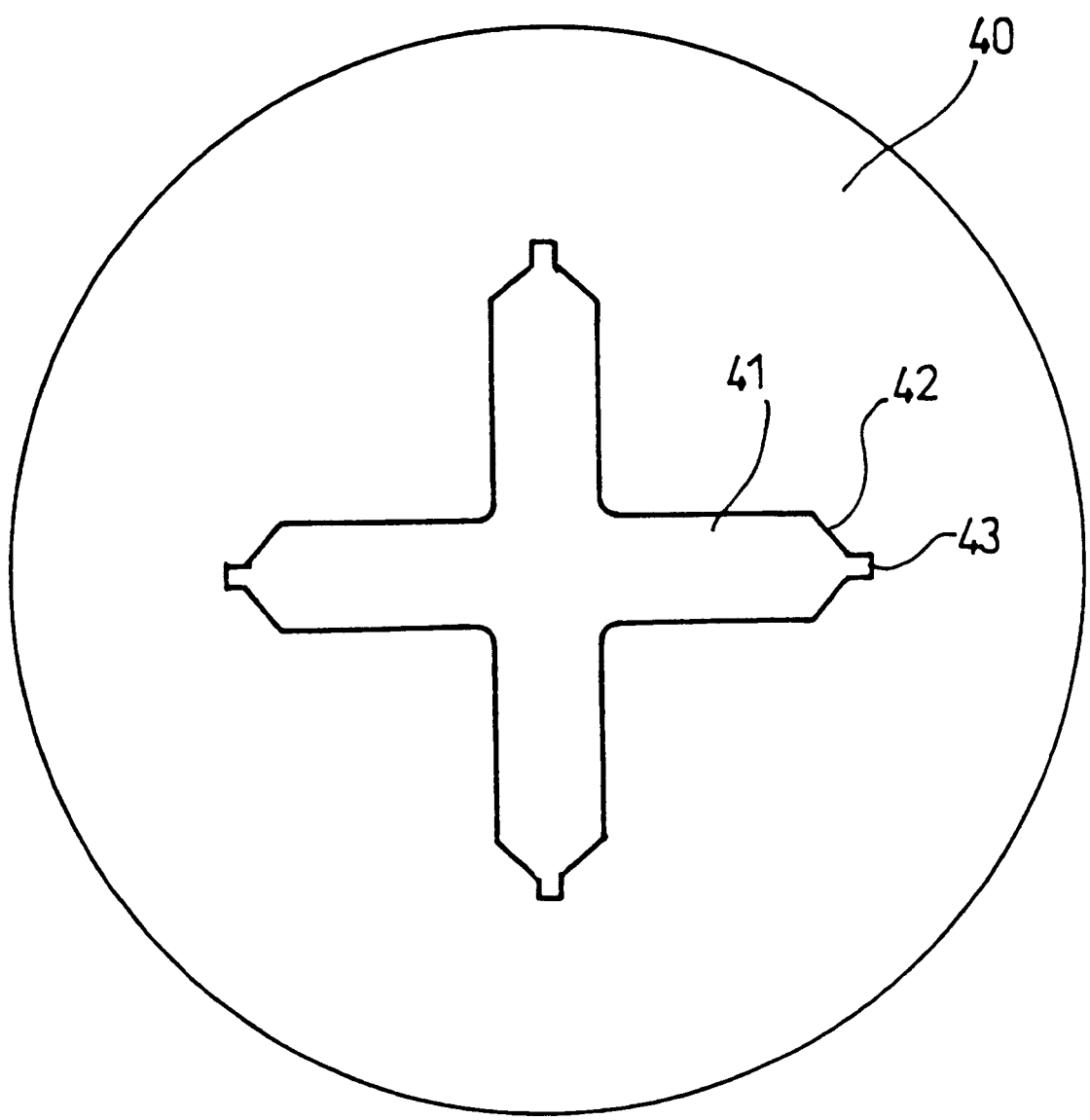
FIG. 8 is a plan view showing the shape of a recess formed in a head of a third embodiment of a screw of the present invention.
Figure 9:
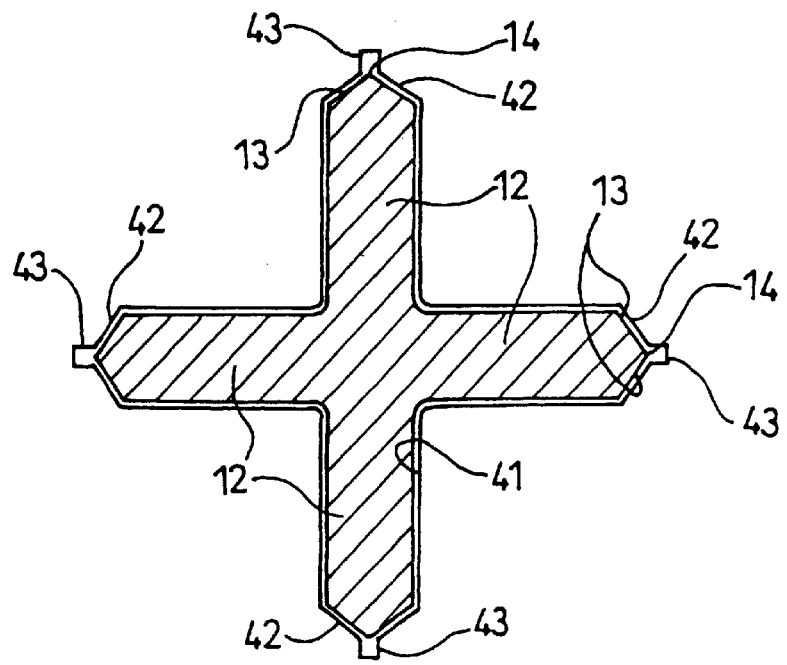
FIG. 9 is a transverse sectional view showing a state in which a blade of the screwdriver shown in FIG. 1 is fitted in the recess of the screw shown in FIG. 8.
Figure 10:
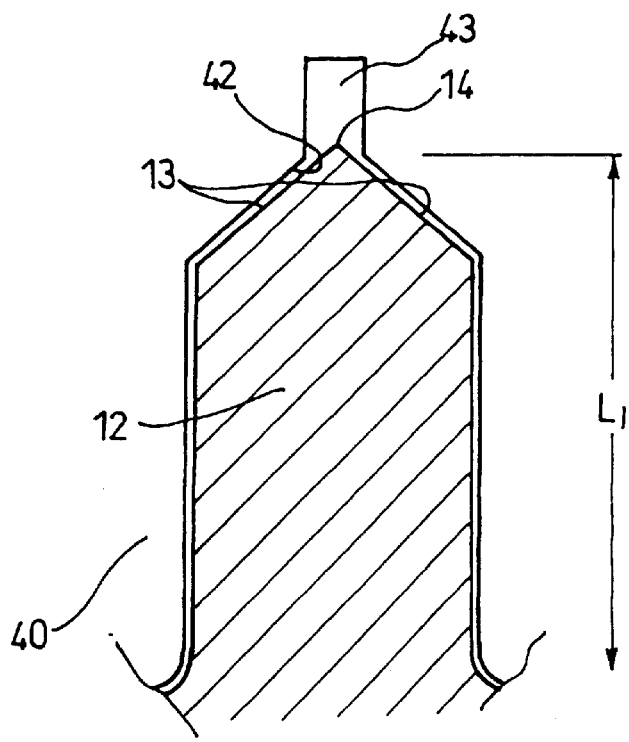
FIG. 10 is a transverse sectional view, on an enlarged scale, of a tip portion of a groove of the recess of the screw shown in FIG. 9.
Figure 11:
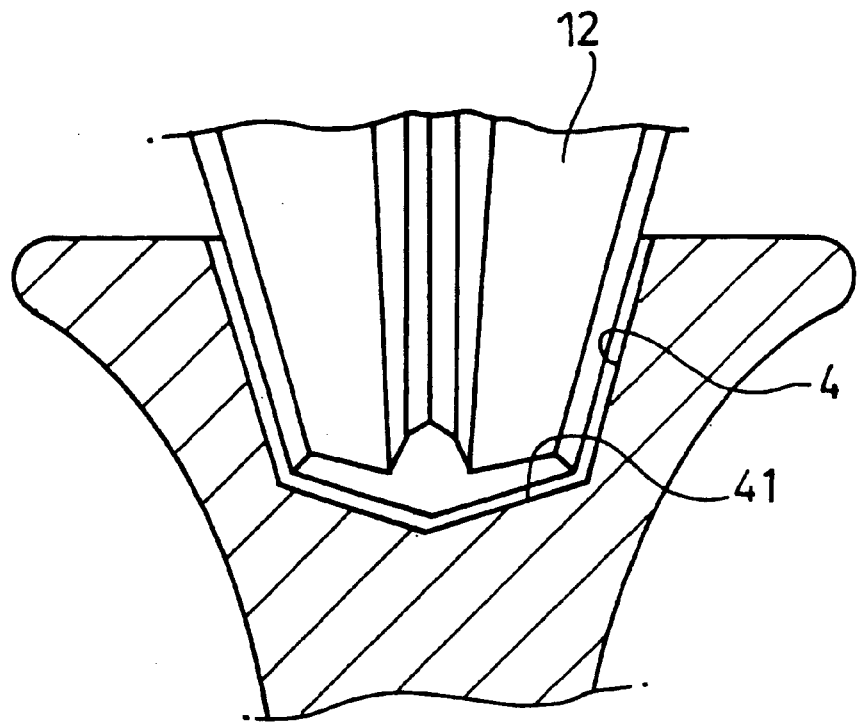
FIG. 11 is a sectional view showing a state in which a screwdriver is fitted in the recess of the screw shown in FIGS. 8 to 10.
Figure 12:
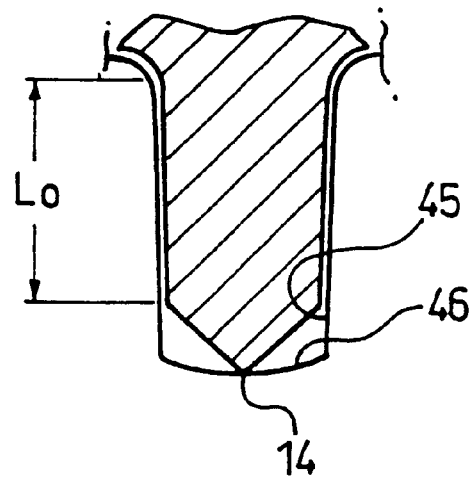
FIG. 12 is a transverse sectional view of a tip portion of a groove of a recess of a related art screw having a usual shape, showing a state in which a blade of a screwdriver is fitted in the recess.

FIG. 8 is a plan view showing a shape of a recess formed in a head of a third embodiment of the screw of the present invention, and FIG. 9 is a transverse sectional view showing a state in which the blade 11 of the screwdriver 10 shown in FIG. 1 is fitted in the recess shown in FIG. 8. A recess 41 formed in the head of the screw according to this third embodiment is formed in a shape into which the blade 11 shown in FIG. 1 can be fitted without any gap, in order to enlarge the contact area between the flat plate portions 12 of the blade 11 and grooves of the recess 41. Also, a bottom portion 42 of each groove of the recess 41 is formed in a V-shape allowing to receive the outer peripheral surface 13 of the flat plate portion 12. As enlargedly shown in FIG. 10, the deepest portion of the bottom portion 42 has a fine groove 43 (gap portion) for avoiding the contact with the ridge line portion 14 of the flat plate portion 12 and the deepest portion of the bottom portion 42. The fine groove 43 extends from the opening portion of the groove of the recess 41 formed in the head of the screw to the deepest portion. If the blade 11 of the screwdriver 10 is fitted in a recess 45 of the related art screw having a usual shape, the ridge line portion 14 is brought in contact with a bottom portion 46 of the recess 45 as shown in FIG. 12, with a result that a contact range L0 between the head 40 of the screw and the recess 41 is made small, to thereby reduce the rotational torque of the screwdriver 10. On the contrary, the recess 41 shown in FIGS. 8 to 10 has a contact range L1 extending up to the vicinity of the ridge line portion 14 as shown in FIG. 10, to thereby ensure the rotational torque of the screwdriver 10. It should be noted that the gap portion is configured as the fine groove 43 formed into a rectangular shape in cross-section in this embodiment; however, it may be configured as a round groove. FIG. 11 is a sectional view showing a state in which the screwdriver 10 is fitted in the recess 41 shown in FIGS. 8 to 10.

Figure 13:
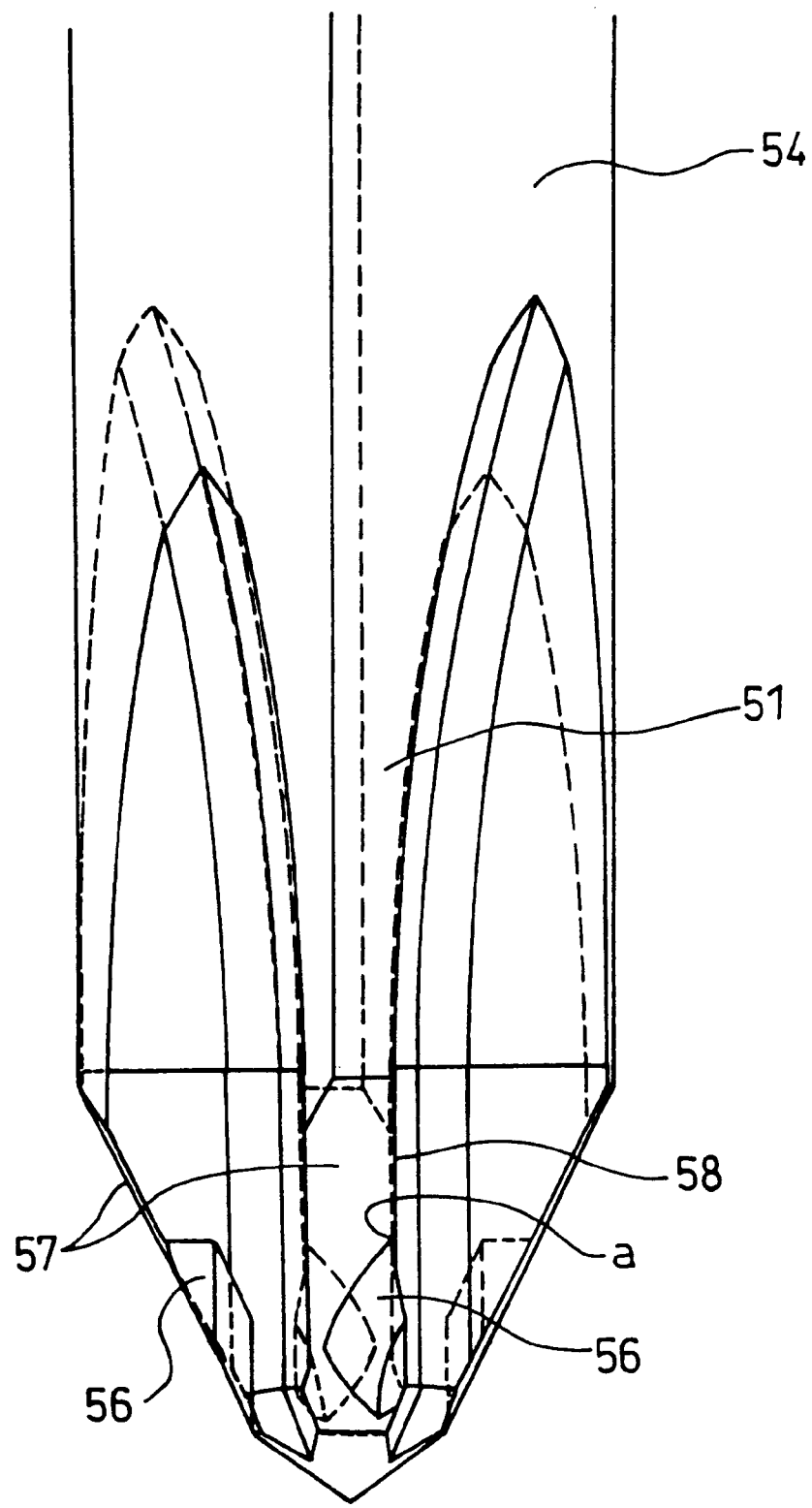
FIG. 13 is a perspective view of a tip portion of a fourth embodiment of the screwdriver, used for a screw tightener, of the present invention.
Figure 14:
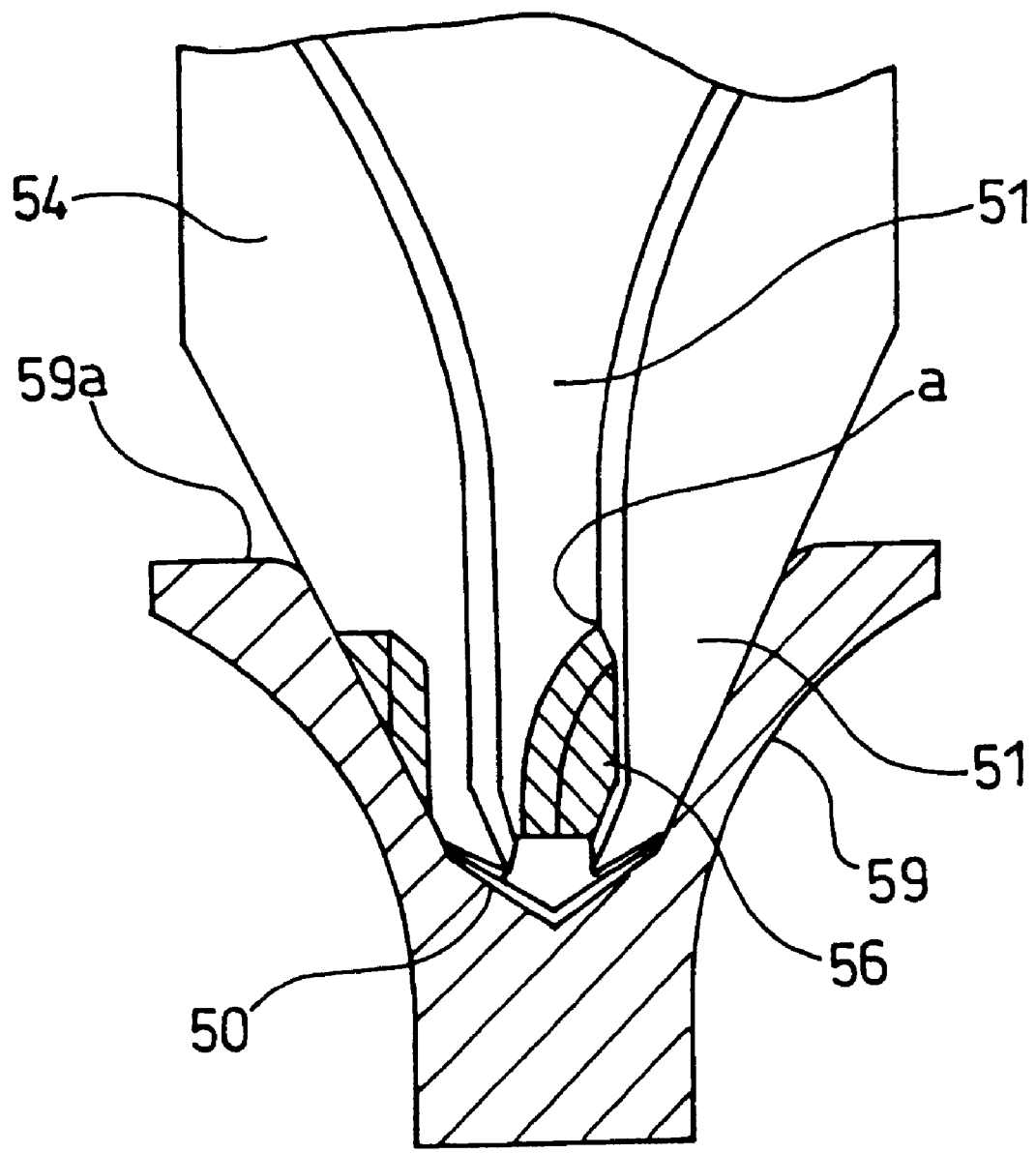
FIG. 14 is a vertical sectional view showing a state in which the tip portion of the blade of the screwdriver shown in FIG. 13 is fitted in a recess of a screw.

FIG. 13 is a perspective view showing a tip portion of a fourth embodiment of the screwdriver, used for a screw tightener, of the present invention. A blade at the tip portion of the screwdriver 54 in the fourth embodiment has four flat plate portions 51 combined with each other in a crisscross shape. An outer peripheral surface 57 of each flat plate portion 51 has a cutout portion 56 at a portion of the outer peripheral port ion 57. The thickness of the end of the outer peripheral surface 57 portion is made thin because of the presence of the cutout portion 56. The cutout portion 56 may be preferably formed at an end portion 58 located on the right side of the outer peripheral surface 57 as seen in the direction of the tip portion to a main portion of the screwdriver 54. The maximum width of the cutout portion 56 may be preferably at least one-sixth the thickness of the flat plate portion 51 or more. Further, as shown in FIG. 14, an end portion "a" of the cutout portion 56 on the side where the screwdriver 54 is mounted on the screw tightener may be preferably located at a position corresponding to the vicinity of a front surface 59a of a head of a screw 59, (more specifically, at a position slightly offset in the recess 50 from the front surface 59a of the head) located when the tip portion of the blade is perfectly fitted in a recess 50 formed in the screw 59.

Figure 15A:
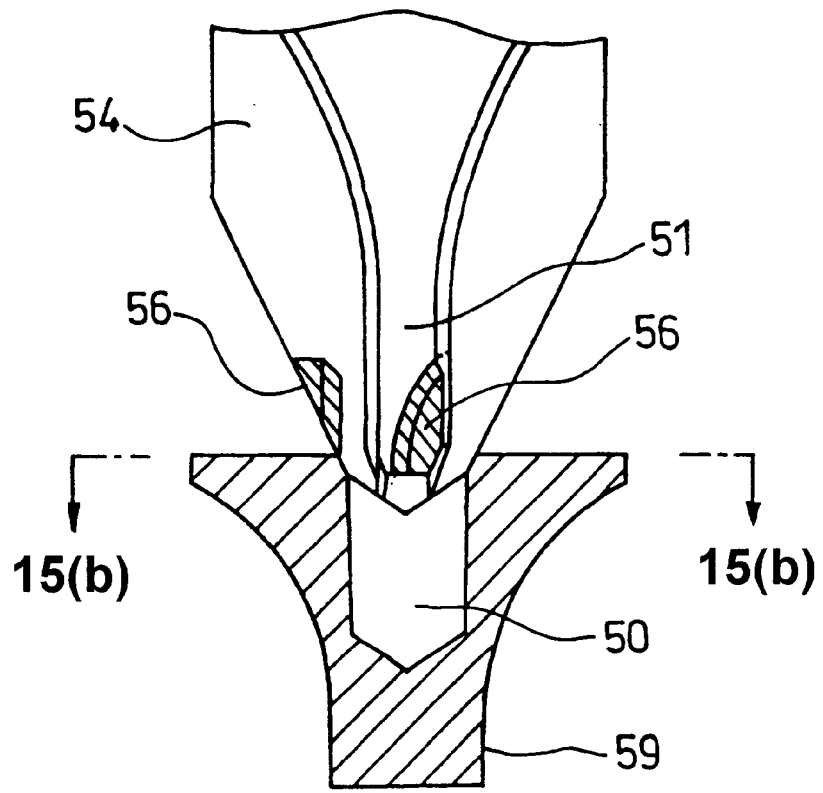
FIG. 15(a) is a vertical sectional view showing a state in which the tip portion of the blade of the screwdriver shown in FIG. 13 begins to be fitted in the recess of the screw.
Figure 15B:
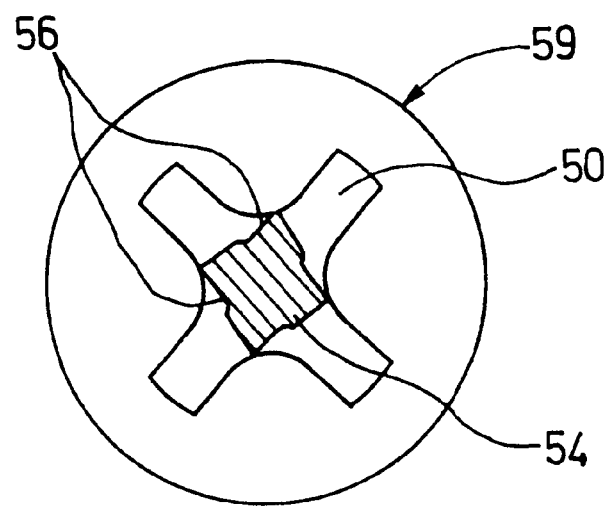
FIG. 15 (b) is a transverse sectional view showing the state shown in FIG. 15(a)

When the screwdriver 54 in the fourth embodiment is actuated by applying an impact force thereto by a screw tightener, the tip portion thereof advances in the recess 50 formed in the head of the screw 59. At this time, even if the outer peripheral surfaces 57 of the flat plate portions 51 are brought in contact with the intersecting portions of the recess 50, the flat plate portions 51 can advance to a position deeper than that in the related art screwdriver because the cutout portions 56 formed in the outer peripheral surfaces 57 enter inward the intersecting portions forming the recess as shown in FIGS. 15(a) and 15(b). Further, since the cutout portions 56 are tilted in relation to the intersecting portions of the recess 50, the screwdriver 54 receives a force applied in the screwing direction (clockwise). In a usual state, the screwdriver 54 is rotated in the screwing direction even in the case where the screwdriver 54 is actuated by applying an impact force thereto by a screw tightener, so that the outer peripheral surfaces 57 can be smoothly fitted in the recess 50. In some cases, a portion of the outer peripheral surface 57, except for the cutout portion 56, of the screwdriver 57 is brought in contact with the intersecting portion of the recess 50; however, since the thickness of such a portion is very small, the cutout portion 56 is instantly brought in contact with the intersecting portion, and accordingly, it is possible to significantly increase the certainty that the flat plate portions 51 are fitted in the recess 50.

Also, since the cutout portion 56 is formed on the right side of the outer peripheral surface 57 in the direction from the tip portion to the main portion of the screwdriver 54, it is not brought in contact with the inner surface of the recess 50 when the screwdriver 54 is rotated for screwing the screw. As a result, the screwing of the screw is not affected by the cutout portions 56 and also the cutout portions 56 are not damaged.

When the tip portion of the screwdriver 54 is properly fitted in the recess 50 of the screw 59, the screw 59 is not tilted, so that the screw 59 is driven while being held by the screwdriver 54 coaxially therewith, that is, it accurately advances along a straight line. This makes it possible to effectively prevent occurrence of inconveniences that the surface of the construction board is broken by the head of the screw 59, the tip portion of the screwdriver 54 is slipped from the recess 50 of the screw 59 to cause a failure in screwing, and an excessive load is applied to the screwdriver 54 to stop the actuation of the screwdriver 54.

Further, since the end portion "a" of the cutout portion 56 on the side where the screwdriver 54 is mounted on the screw tightener is located at a position corresponding to the vicinity of the front surface 59a of the head of the screw 59 (more specifically, at a position slightly offset in the recess 50 from the front surface 59a of the head) located when the tip portion of the flat plate portion 51 is perfectly fitted in the recess 50 of the screw 59, the strength of the flat plate portion 51 is prevented from being degraded.

Figure 16:
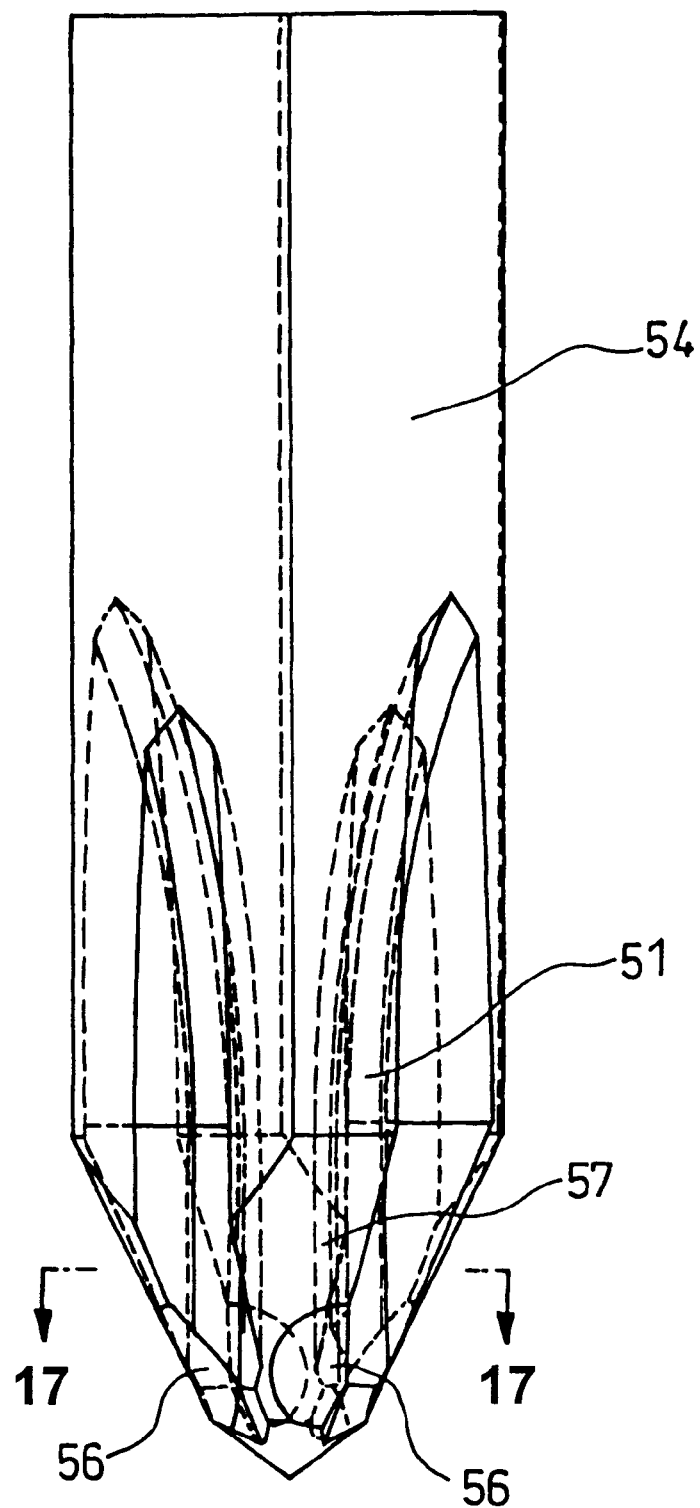
FIG. 16 is a side view showing a fifth embodiment of the screwdriver, used for a screw tightener, of the present invention.
Figure 17:
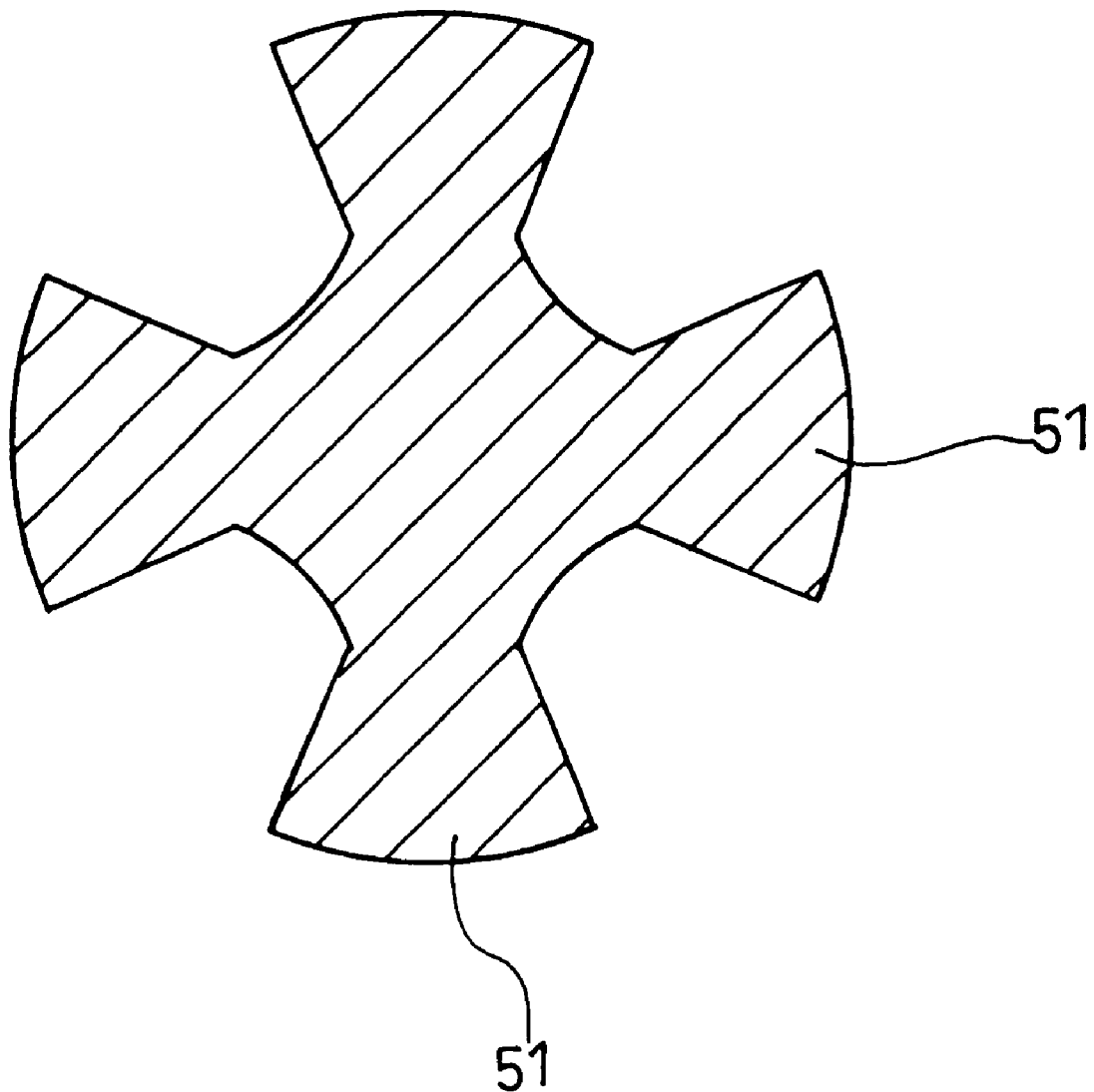
FIG. 17 is a transverse sectional view showing a tip portion of the screwdriver shown in FIG. 16.

FIG. 16 is a side view showing a fifth embodiment of the screwdriver, used for a screw tightener, of the present invention; and FIG. 17 is a transverse sectional view of a tip portion of the screwdriver according to the fifth embodiment. In this fifth embodiment, flat plate portions 51 of the screwdriver are formed into a crisscross shape having four elements spread out in transverse cross-section, and cutout portions 56 are each formed in an outer peripheral surface 57 of the flat plate portion 51. The fifth embodiment exhibits an effect similar to that obtained by the fourth embodiment. The transverse cross-section of a recess of an associated screw is of course formed into a shape corresponding to the cross-section of the flat plate portions 51.

Figure 18:
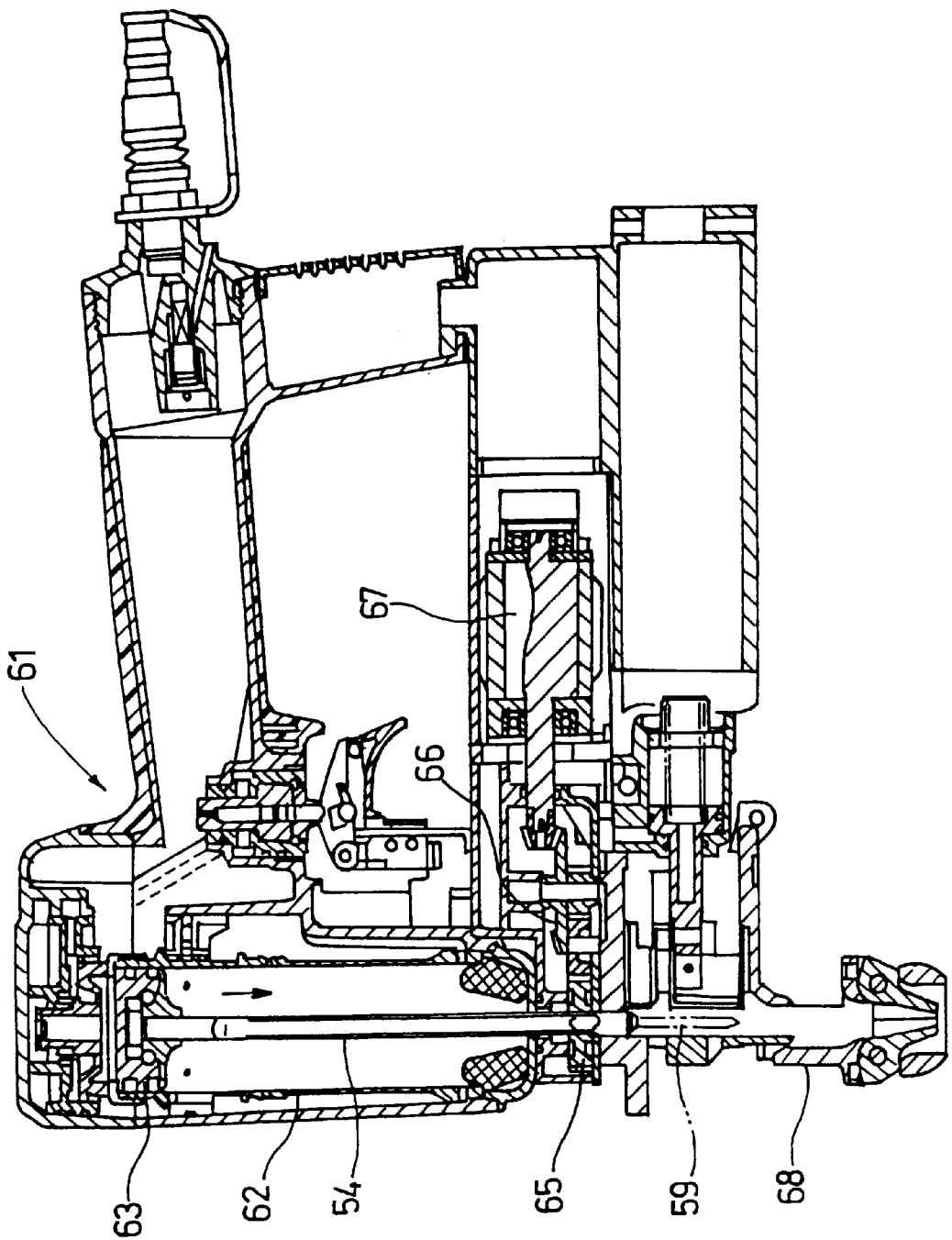
FIG. 18 is a sectional view showing one example of a screw tightener on which the screwdriver of the present invention is mounted.
Figure 19:
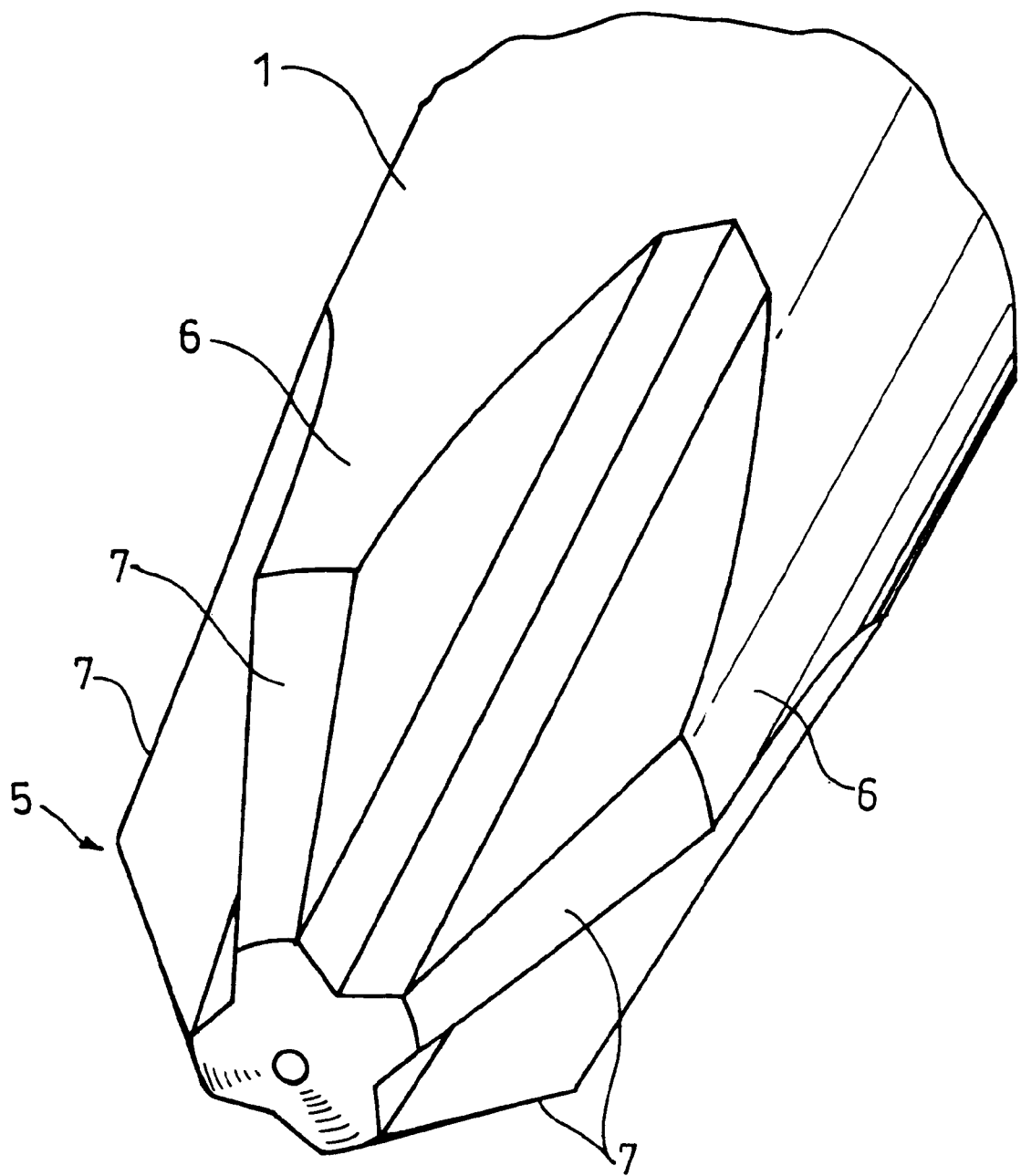
FIG. 19 is a perspective view showing one example of a tip portion of a related art screwdriver used for a screw tightener.
Figure 20:
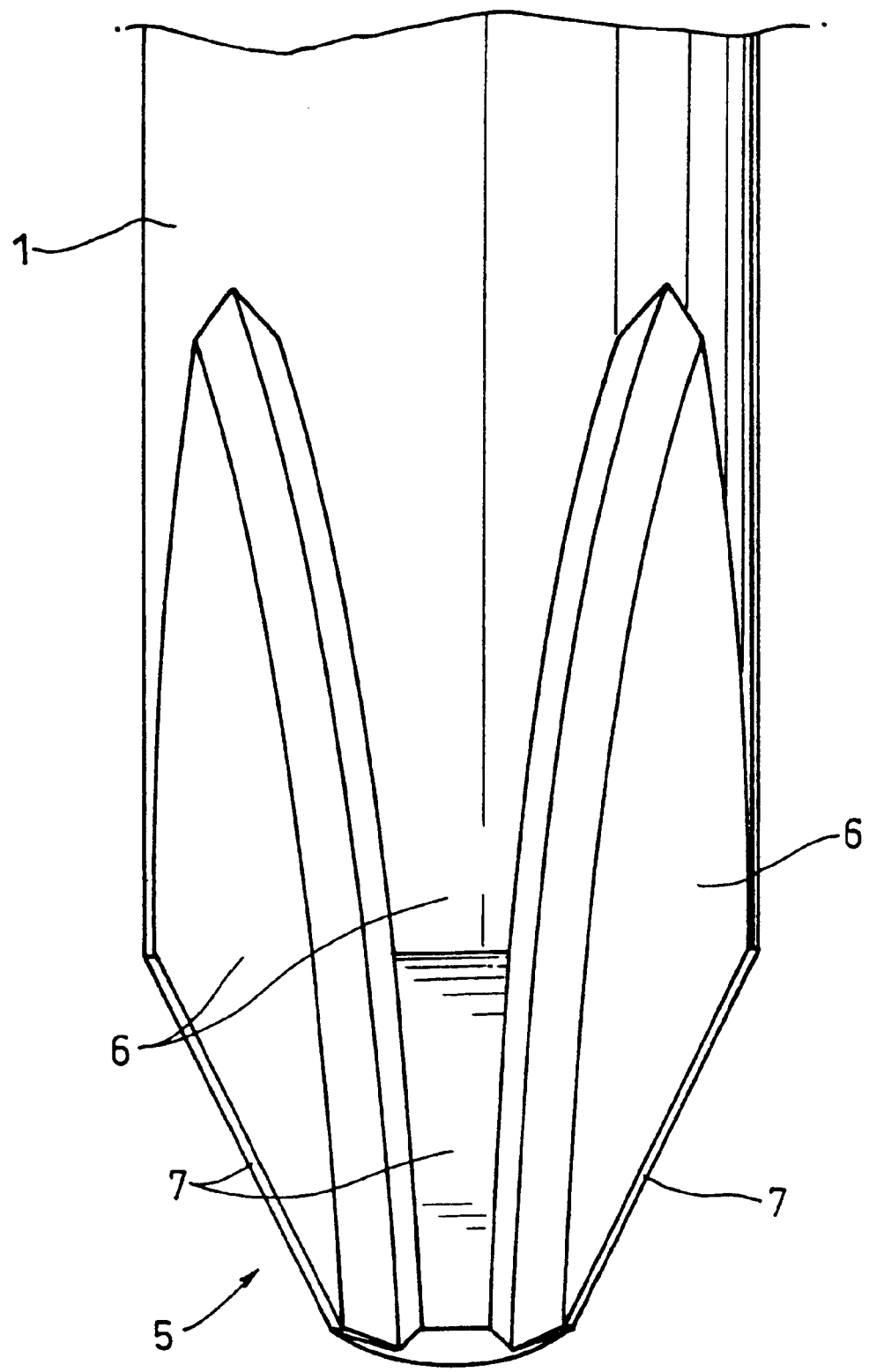
FIG. 20 is a side view showing an outer peripheral surface of a blade of the screwdriver shown in FIG. 19.
Figure 21:
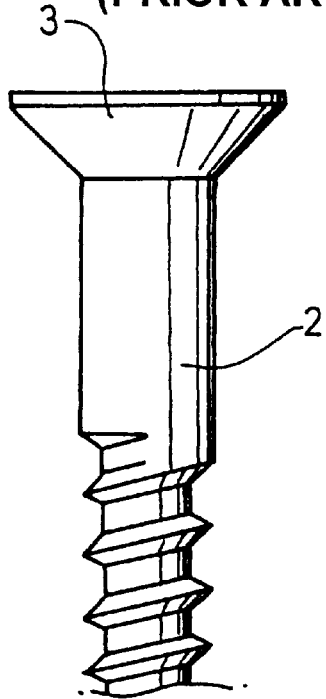
FIG. 21 is a side view showing one example of a related art screw suitably tightened by a screwdriver mounted on a screw tightener.
Figure 22:
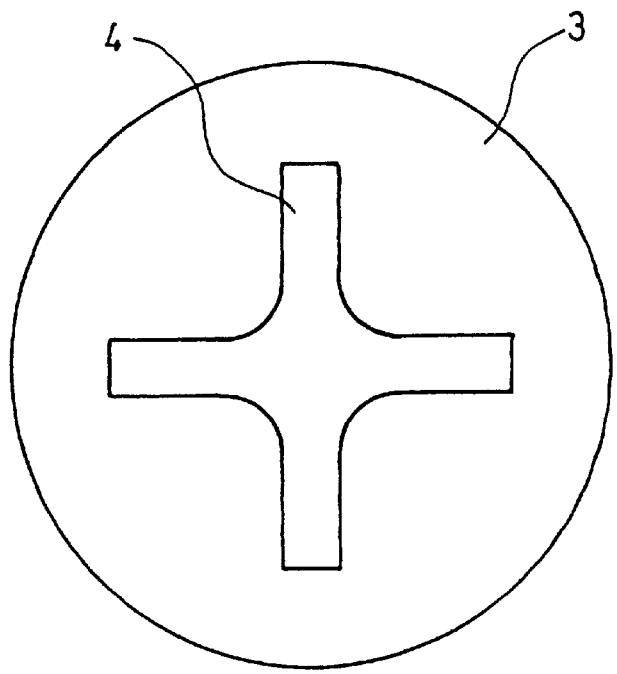
FIG. 22 is a plan view showing a head of the screw shown in FIG. 21.

FIG. 18 is a sectional view showing one example of a screw tightener on which the screwdriver of the present invention is mounted. In the figure, reference numeral 61 designates the screw tightener. The screw tightener 61 includes an impact cylinder 62 in which an impact piston 63 is slidably contained. A screwdriver 54 is mounted to the impact piston 63 and a gear 65 is axially movably fitted to the screwdriver 54. The gear 65 is also coupled with a drive means 67 such as an air motor via an intermediate gear 66. A compressed air is fed into the impact cylinder 62, to drive the impact piston 63 for moving the screwdriver 54 in the axial direction. The axial movement of the screwdriver 54 applies an impact force to a screw 59 supplied into a nose portion 68, causing the screw 59 to be driven in an object such as a construction board to a specific depth. After that, the screw 59 is screwed in the construction board by rotating the screwdriver 54.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A screwdriver, used for a screw tightener, including at a tip portion of said screwdriver a blade having a plurality of flat plate portions to be meshed in a recess formed in a head of a screw, wherein each of said flat plate portions has an outer peripheral surface which extends in such a manner as to be converged in the direction toward the tip portion of said screwdriver, said outer peripheral surface being formed into an angled shape having a ridge line portion extending in the direction toward the tip portion of said screwdriver.

2. A screwdriver used for a screw tightener according to claim 1, wherein said ridge line portion of said outer peripheral surface of at least one of said flat plate portions is offset one of rightwardly and leftwardly from a center line of said flat plate portion in a thickness direction of said flat slate portion.

3. A screwdriver, used for a screw tightener, including at a tip portion of said screwdriver a blade having a plurality of flat plate portions to be meshed in a recess formed in a head of a screw, wherein each of said flat plate portions has an outer peripheral surface which extends in such a manner as to be converged in the direction toward the tip portion of said screwdriver to form a ridge, at least one of said outer peripheral surfaces having a cutout portion formed at a portion thereof.

4. A screwdriver used for a screw tightener according to claim 3, wherein said cutout portion is formed on the right side of said outer peripheral surface as seen in the direction from the tip portion to a main portion of said screwdriver.

5. A screwdriver used for a screw tightener according to claim 3, wherein an end portion of said cutout portion is located at a position corresponding to said recess of said screw so that said tip portion of said blade is perfectly fitted in said recess of said screw.

6. A screwdriver used for a screw tightener according to claim 3, wherein the maximum width of said cutout portion is at least one-sixth a thickness of said flat plate portion.

7. A screwdriver used for a screw tightener according to claim 3, wherein said flat plate portions of said screwdriver are formed into a crisscross shape having four elements spread out in transverse cross-section.

* * * * *